March 10, 1936. A. L. HESTON 2,033,896

TIRE BUILDING APPARATUS

Filed Feb. 3, 1934 4 Sheets-Sheet 2

INVENTOR
ALLEN L. HESTON
By Ely & Barrow
ATTORNEYS

March 10, 1936. A. L. HESTON 2,033,896

TIRE BUILDING APPARATUS

Filed Feb. 3, 1934 4 Sheets-Sheet 4

INVENTOR
ALLEN L. HESTON

BY Ely & Barrow

ATTORNEYS

Patented Mar. 10, 1936

2,033,896

UNITED STATES PATENT OFFICE 2,033,896

TIRE BUILDING APPARATUS

Allen L. Heston, Akron, Ohio, assignor to National Rubber Machinery Company, Akron, Ohio, a corporation of Ohio Application February 3, 1934, Serial No. 709,624

9 Claims. (Cl. 154—9)

This invention relates to tire building apparatus, and more especially it relates to mechanism for operating a pair of movable structures that are disposed at opposite sides of a tire building form or drum and arranged to be moved into and out of juxtaposition with the latter during the manufacture of pneumatic tire casings thereon.

The movable structures referred to are shown herein, for the purpose of illustration only, as cylindrical rings of the same outside diameter as the drum, said rings supporting the marginal portions of fabric plies while the latter are being mounted on the drum and spliced thereon, and being positioned at convenient removed positions at other times during the fabrication of a tire. It is within the purview of the invention to utilize the apparatus for operating a pair of bead-setting rings such as are sometimes used in conjunction with tire building drums.

The chief objects of the invention are to provide improved apparatus for presenting a pair of rings concentrically to opposite sides of a tire building drum, and for retracting them therefrom; and to provide for imparting to one of the rings, at least, a succession of different movements so that it may have an inoperative position that leaves one side of the drum unobstructed so as to facilitate the removal of work therefrom. Other objects will be manifest.

Of the accompanying drawings.

Figure 1:
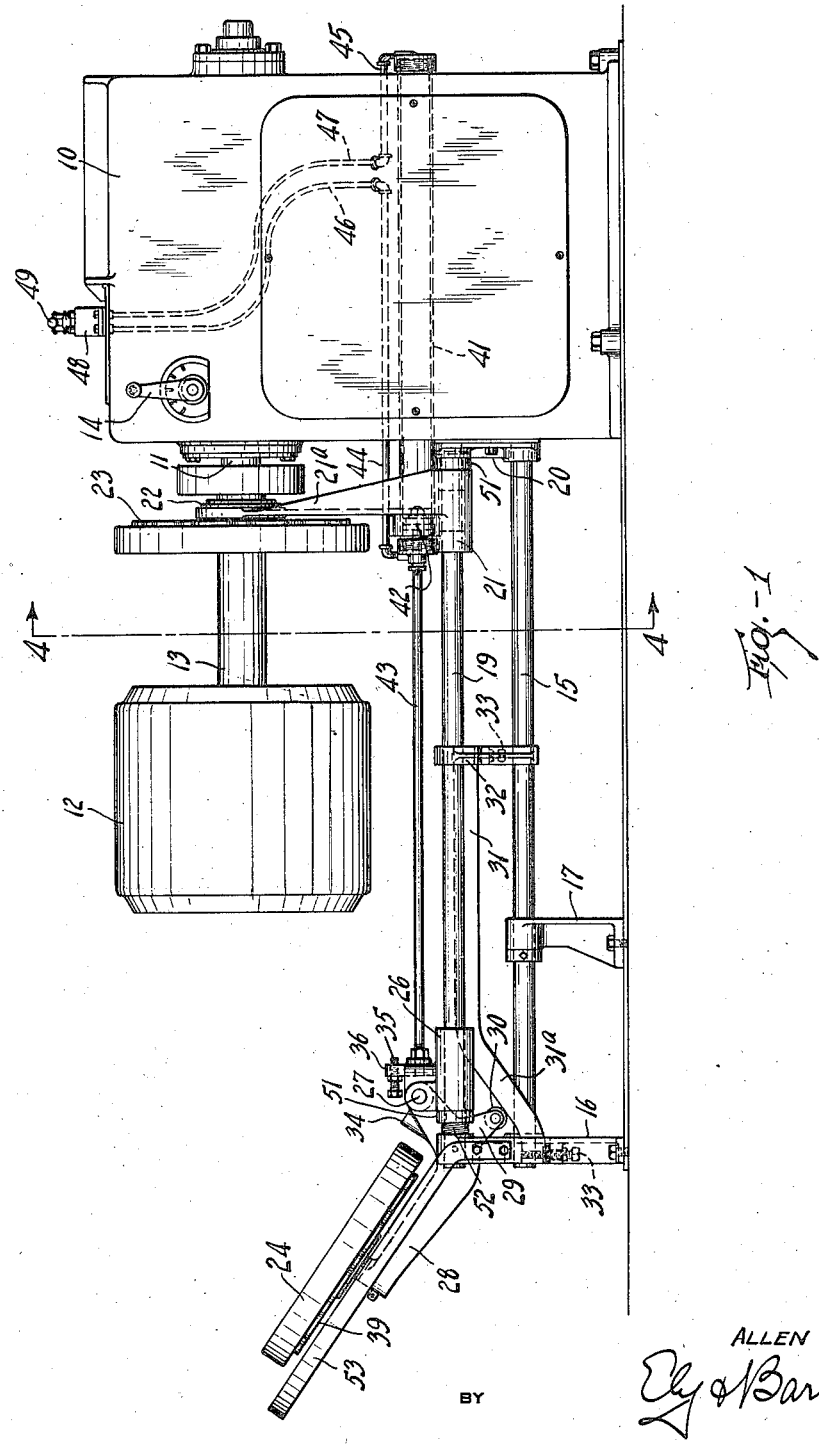
Figure 1 is a front elevation of tire building apparatus embodying the invention, in its preferred form, in inoperative position.

Referring to the drawings, 10 is the housing or frame of a tire building machine that includes the usual rotatable spindle 11 and collapsible, drop-shouldered tire building drum 12. The spindle 11 is surrounded by a sleeve 13 which may be moved angularly of the said spindle to effect collapse of the drum. The spindle 11 is driven by the usual motor (not shown), that is mounted within housing 10, and the direction of rotation of the spindle may be reversed through suitable mechanism controlled by hand lever 14 on the housing wall. Below the drum 12, parallel to the spindle 11 and slightly to one side thereof is a rotatable shaft 15 that extends from the housing 10 and has its free end supported in a journal bracket 16. A second supporting bracket 17 is positioned somewhat nearer the said housing. The shaft 15 normally carries tire building mechanism such as stitching tools (not shown) and is turned angularly during operation by suitable mechanism (not shown).

Figure 2:
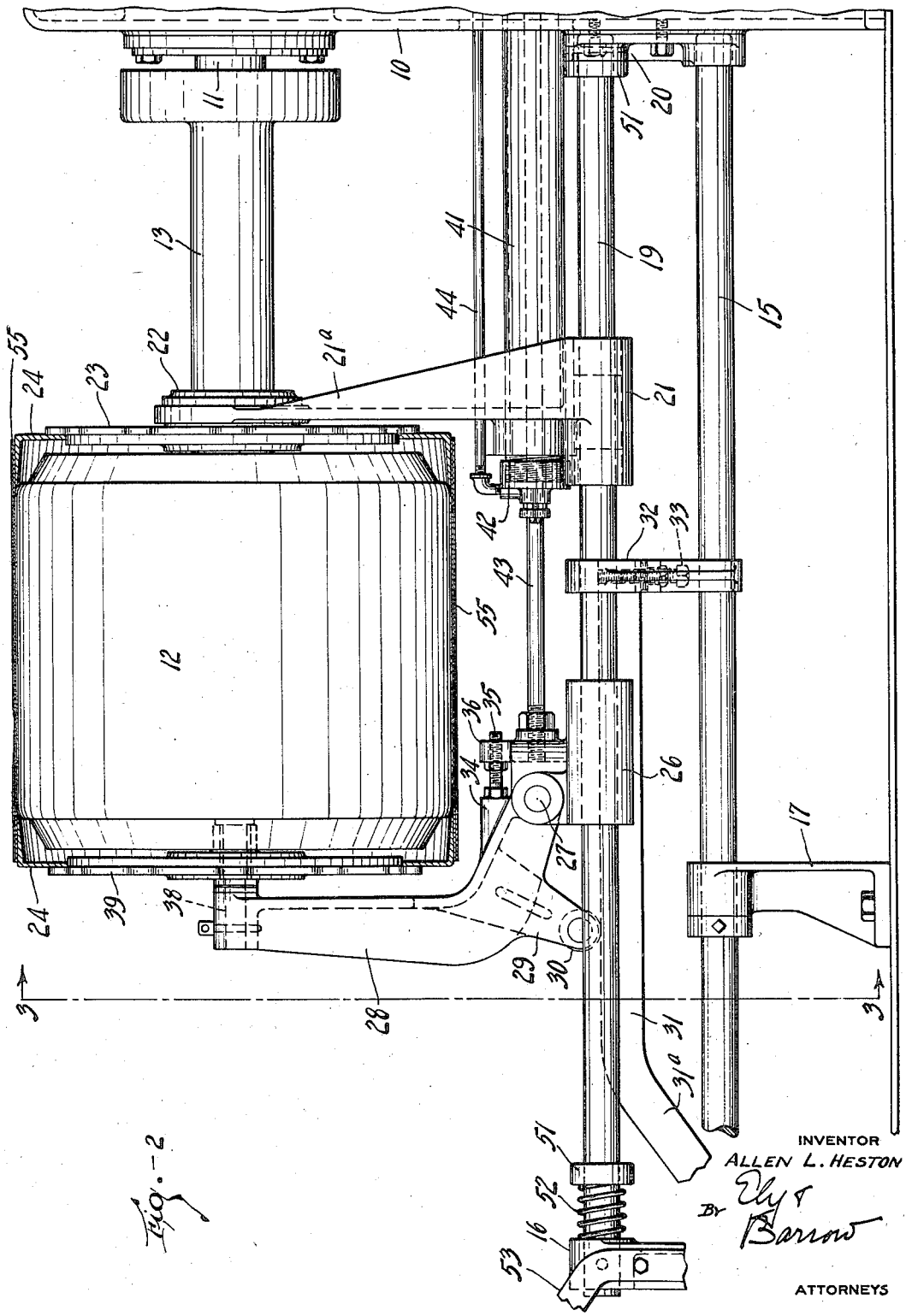
Figure 2 is a fragmentary view of the apparatus shown in Figure 1, and the work thereon, on a larger scale and in operative position.

Positioned above and parallel to shaft 15 is a pair of supports or guide rods 19, 19 that have one of their ends mounted in a supporting bracket 20 mounted upon the side of housing 10, and have their other ends supported by the bracket 16. Slidably mounted upon rods 19 is a carriage or slide 21 that is formed with an upwardly extending arm portion 21ª that encircles sleeve 13, in spaced relation thereto. Between arm portion 21ª and sleeve 13 is a tubular bushing 22 that is rotatable relatively of the arm and sleeve and is slidable on the latter. Keyed to bushing 22 is a circular disc-like support or spider 23, and secured to the perimeter of said spider is one of a pair of splicing rings 24, the arrangement being such that the latter is concentric with drum 12. The splicing ring is angular in section, and comprises a relatively wide peripheral portion of substantially the same outside diameter of the drum so as to constitute, in effect, a lateral extension of the drum when it is in juxtaposition thereto, as is shown in Figure 2. The construction shown is such that the ring 24 and spider 23 may rotate with drum 12 when engaged therewith, but they may be so mounted on slide 21 as to be non-rotatable if desired.

Figure 3:
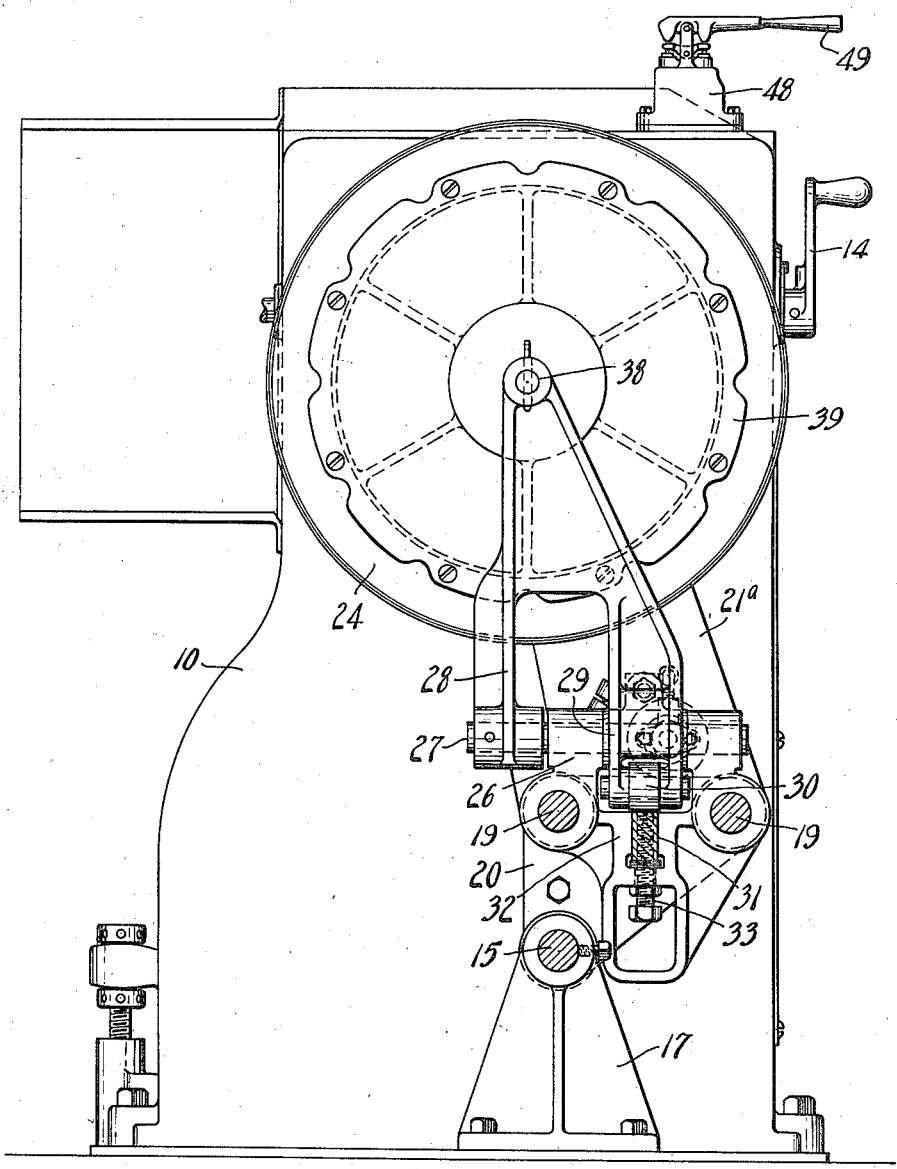
Figure 3 is a section on the line 3—3 of Figure 2.
Figure 4:
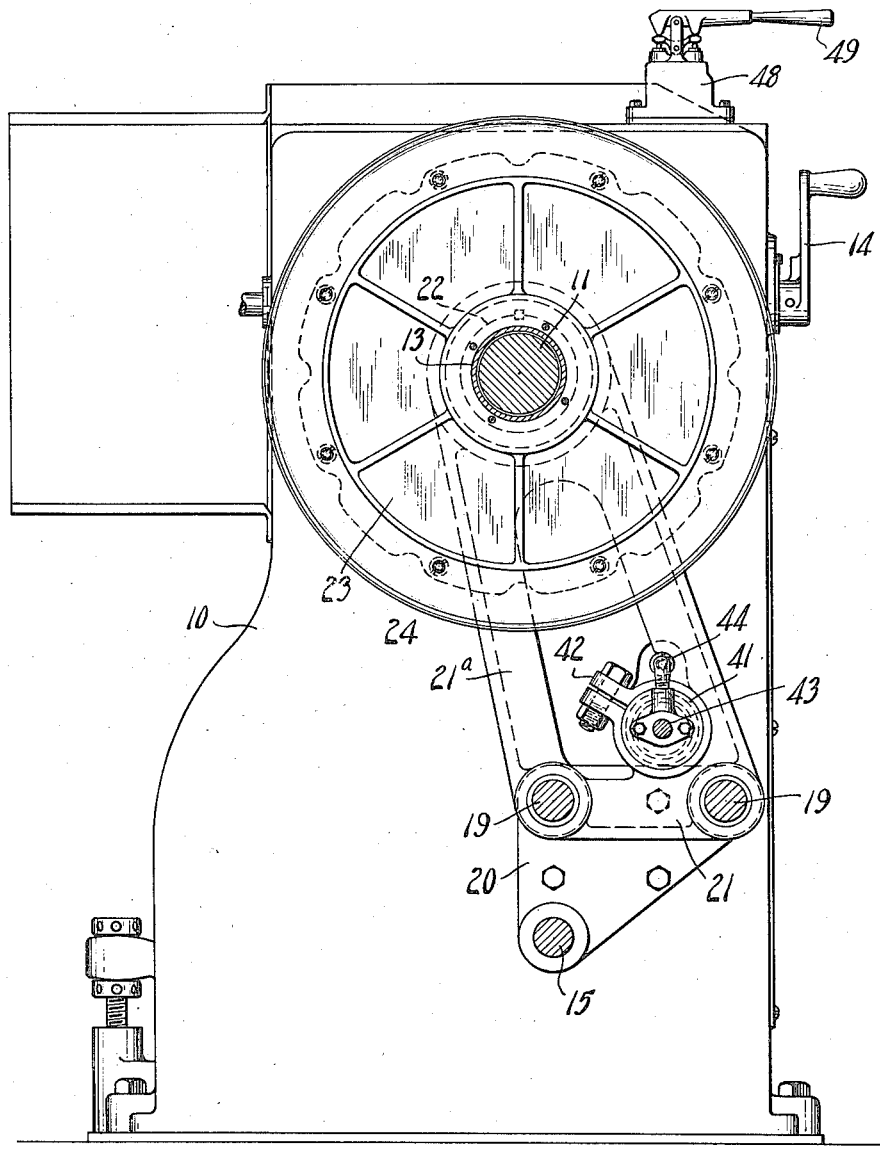
Figure 4 is a section on the line 4—4 of Figure 1.

Slidably mounted upon the guide rods 19, between the slide 21 and bracket 16, is a second carriage or slide 26 carrying a horizontal, transverse, hinge pin 27 upon which is pivotally mounted an angular, upwardly extending, swinging arm 28. Formed on said swinging arm and extending obliquely downwardly therefrom is a bracket arm 29 having a bifurcated free end portion in which a roller 30 is journaled, said roller riding upon a rail 31 positioned between guide rods 19. The rail 31 is supported at its inner end by a bracket 32 that is suspended from rods 19, between slides 21, 26, and at its outer end the rail is supported by bracket 16. Each of said brackets includes an adjustment screw 33 that is threaded vertically through the rail end to assure proper angular positioning of the rail. As is clearly shown in the drawings, the rail 31 is bent in its own plane at its outer end to provide a relatively short angular portion 31ª that extends obliquely downwardly, the major portion of the rail being horizontally disposed. The arrangement is such that when the roller 30 is on the horizontal portion of the rail the arm 28 is in an upright position as shown in Figures 2 and 3, and when said roller is on the angular portion 31ᵃ of the rail the arm 28 is in the tilted position shown in Figure 1. The arm 28 is formed with a lug or boss 34 that abuts an adjustable stop, comprising a screw 35 threaded into an ear 36 formed on slide 26, when the arm is in upright position, with the result that the angular movement of the arm is between determinate, adjustable limits.

At its free end the arm 28 as shown carries a laterally extending, fixed spindle 38 which, in the upright position of the arm, is in axial alignment with spindle 11. Suitably journaled upon spindle 38 is a support or spider 39 that is similar to spider 23, and mounted upon the perimeter of spider 39 is the other splicing ring 24 that is identical in form and function to that previously described. In the upright position of arm 28 the second ring 24 is concentric with drum 12 and engageable therewith. In the construction described the spider 39 is rotatable on spindle 38, but it may be fixed thereto if desired.

The slides 21, 26 are movable along the rods 19, toward and away from each other to apply rings 24 to drum 12 and to remove them therefrom, and for so moving said slides a single power member is provided. Said power member consists of an elongate double-acting fluid pressure operated cylinder 41 that is carried by slide 21, its forward end portion being secured to the latter by clamp 42, the rear of the cylinder extending through suitable openings into housing 10. The piston rod 43 of cylinder 42 has its outer end connected to slide 26. Pressure fluid is conducted to and from the respective ends of cylinder 41 through inlet-and-outlet pipes 44, 45, which pipes are connected by respective flexible conduits 46, 47 to a four-way valve 48 that is mounted atop the housing 10. Pressure fluid is conducted to valve 48 from any suitable source of supply (not shown) and diverted into pipes 46, 47 by means of the usual operating lever 49.

Buffers for the respective slides 21, 26 are mounted on the guide rods 19 at the respective ends thereof, said buffers comprising blocks of resilient rubber 51, 51. At the outer ends of rods 19 the rubber blocks 51 are backed by respective compression springs 52 mounted on the rods between the block 51 and bracket 16. An arcuate metal guard 53 may be supported upon bracket 16 in position to prevent a person from being struck by the outer ring structure 24 as it moves to the inoperative position shown in Figure 1.

In the operation of the apparatus, assuming it to be in the inoperative position shown in Figure 1, the valve 48 is operated to admit fluid pressure through pipes 46, 44 into the front (left-hand) end of cylinder 41. Due to the tilted position of arm 28 on slide 26, the latter has more resistance to movement longitudinally of rods 19 than does slide 21, with the result that slide 21 and cylinder 41 move forward relatively of piston rod 43. This movement continues until stopped by engagement of ring 24 with drum 12, whereupon the pressure in cylinder 41 builds up sufficiently to draw slide 26 toward slide 21, the roller 30 riding up incline 31ᵃ of rail 31 and thereby tilting arm 28 to upright position in the manner of a cam. The abutment screw 35 prevents sudden tilting movement of the arm 28 from throwing it upwardly beyond the desired position. Movement of slide 26 along rods 19 continues until stopped by engagement of the other ring 24 with the side of drum 12. Pressure in the cylinder 41 is maintained to hold both rings 24 firmly against the drum.

The apparatus is now in the position shown in Figure 2, and the drum 12 may now be rotated and tire building material, such as the fabric plies 55 mounted thereon. Each ply has its ends spliced together, and the plies are rolled firmly together, the rings 24 supporting the respective marginal portions of the plies during these operations to facilitate the operations and effect uniformity of structure in the assembled plies.

To return the rings 24 to inoperative position, the previously described operations are reversed. Fluid pressure is admitted to pipes 47, 45 to charge the rear end of cylinder 41 while the front end thereof is discharged through pipes 44, 46. Since in the positions shown in Figure 2 the resistance to movement of slides 21, 26 is about equal, either may be the first to move. Slide 21 moves toward the right to the position shown in Figure 1, carrying with it cylinder 41. Slide 26 moves toward the left, the arm 28 maintaining its erect position and its ring 24 remaining in axial alignment with the drum until roller 30 passes onto the inclined portion 31ᵃ of rail 31 whereupon the arm 28 tilts angularly to the inclined position shown in Figure 1. Buffers 51 assure that both slides 21, 26 come to a gentle stop. This completes a cycle of operation which is subsequently repeated on other tires. The tire being built upon drum 12 is completed in any known or preferred manner, and is removed from the drum after the latter is collapsed, the outer ring 24 being conveniently positioned so as not to impede the removal of the tire. Since both rings 24 approach the drum with rectilinear movement parallel to the axis thereof, accurate registry of the rings with the drum is effected.

The invention provides for full mechanical operation of both side rings of a tire building drum, and achieves the other advantages set out in the foregoing statement of objects.

Modification may be resorted to without departing from the spirit of the invention or the scope of the appended claims.

What is claimed is:

1. Tire building apparatus comprising a rotatable, tire building form, a ring engageable with one side of the form, an arm supporting said ring, at one of its ends, said arm being pivoted at its other end upon an axis disposed transversely of the axis of the form, means for imparting a movement of translation to the pivot of the arm in a direction parallel to the axis of the form, and means for swinging the arm on its pivot after determinate movement of the latter.

2. Tire building apparatus comprising an annular, rotatable tire building drum, a ring engageable with one side of the drum, an arm supporting said ring, a rail having a portion of its structure parallel to the axis of the drum and a portion disposed at an angle thereto, and means for moving said arm longitudinally of said rail.

3. A combination as defined in claim 2 in which the means for moving the arm is a fluid pressure cylinder.

4. Tire building apparatus comprising a rotatable tire building form, a ring engageable with one side of the form, an arm supporting said ring, a slide upon which said arm is pivotally mounted, means for moving said slide in a course that is parallel to the axis of said form, and means for moving the arm angularly on said slide in a determinate region of said course.

5. Tire building apparatus comprising a rotatable tire building form, a ring engageable concentrically with one side of said form, an arm supporting said ring, a slide upon which said arm is pivotally mounted, means for moving said slide to carry said ring toward and away from said form, and cam means for swinging the arm on its pivot as it is so moved.

6. Tire building apparatus comprising a rotatable tire building form, a ring engageable concentrically with one side thereof, an arm supporting said ring, a slide upon which said arm is pivotally mounted, guide rods disposed parallel to the axis of the form supporting said slide, means for moving the latter longitudinally of said guide rods, and a cam engaging said arm, said cam having a portion that is parallel to the axis of the form and a portion at an angle thereto, said cam being adapted to swing the arm on the slide as the latter moves longitudinally of the guide rods.

7. A combination as defined in claim 6 including an adjustable stop on the slide for limiting the swinging movement of the arm in one direction under the impetus of the cam.

8. Tire building apparatus comprising a rotatable tire building drum, a pair of rings engageable with the respective lateral marginal portions of said drum, and a single fluid pressure cylinder for moving both rings toward and away from the drum, the course of one of said rings comprising a region of rectilinear movement that is parallel to the axis of the drum and a region that is oblique thereto.

9. Tire building apparatus comprising a rotatable tire building drum, a pair of rings engageable concentrically with the respective sides thereof, respective supporting structures for said rings, and a single fluid pressure cylinder mounted on one of said ring supporting structures and connected to the other structure for so moving both of them as to move the said rings toward and away from the drum, the movement of one of said rings at least being in part rectilinear and parallel to the axis of the drum and in part at an angle thereto.

ALLEN L. HESTON.